United States Patent [19]
Patarino

[11] Patent Number: 4,735,258
[45] Date of Patent: Apr. 5, 1988

[54] COOLING AIR TREATMENT DEVICE FOR TRANSMITTER VALVES

[75] Inventor: Piero P. Patarino, Milan, Italy

[73] Assignee: GTE Telecomunicazioni S.p.A., Milan, Italy

[21] Appl. No.: 11,927

[22] Filed: Feb. 6, 1987

[30] Foreign Application Priority Data

Feb. 19, 1986 [IT] Italy .............................. 19452 A/86

[51] Int. Cl.⁴ ........................................... B60H 1/16
[52] U.S. Cl. .................................. 165/40; 165/108; 361/384; 313/13
[58] Field of Search ...................... 361/382, 383, 384; 313/12, 13; 165/40, 108

[56] References Cited

U.S. PATENT DOCUMENTS

| | | | |
|---|---|---|---|
| 2,181,953 | 12/1939 | Usselman | 313/12 |
| 2,352,893 | 7/1944 | Hansell | 313/12 |
| 4,008,756 | 2/1977 | Hufford | 165/40 X |
| 4,019,566 | 4/1977 | Cobb | 165/40 X |
| 4,113,005 | 9/1978 | Cantrell, Jr. | 165/40 |

FOREIGN PATENT DOCUMENTS

| | | | |
|---|---|---|---|
| 1000685 | 3/1983 | U.S.S.R. | 165/40 |
| 1008795 | 3/1983 | U.S.S.R. | 165/40 |

Primary Examiner—Albert W. Davis, Jr.
Assistant Examiner—Peggy Neils
Attorney, Agent, or Firm—Oblon, Fisher, Spivak, McClelland & Maier

[57] ABSTRACT

High-power transmitter valves are located in a housing through which a fan feeds a cooling air stream between an inlet point and an outlet point, the inlet air temperature being required to lie within a range set by the valve manufacturer. The device according to the invention, which is located outdoors, comprises a first duct connected to the inlet point of said housing and a second duct connected to the outlet point thereof. Both the first and second ducts are connected to the outside atmosphere, the first by way of a filter and the second by way of a throttle valve which enables a fraction of the air flowing through the second duct to be recycled to the first duct upstream of the filter, and which for this purpose is controlled by a temperature transducer located in the first duct downstream of filter.

8 Claims, 2 Drawing Sheets

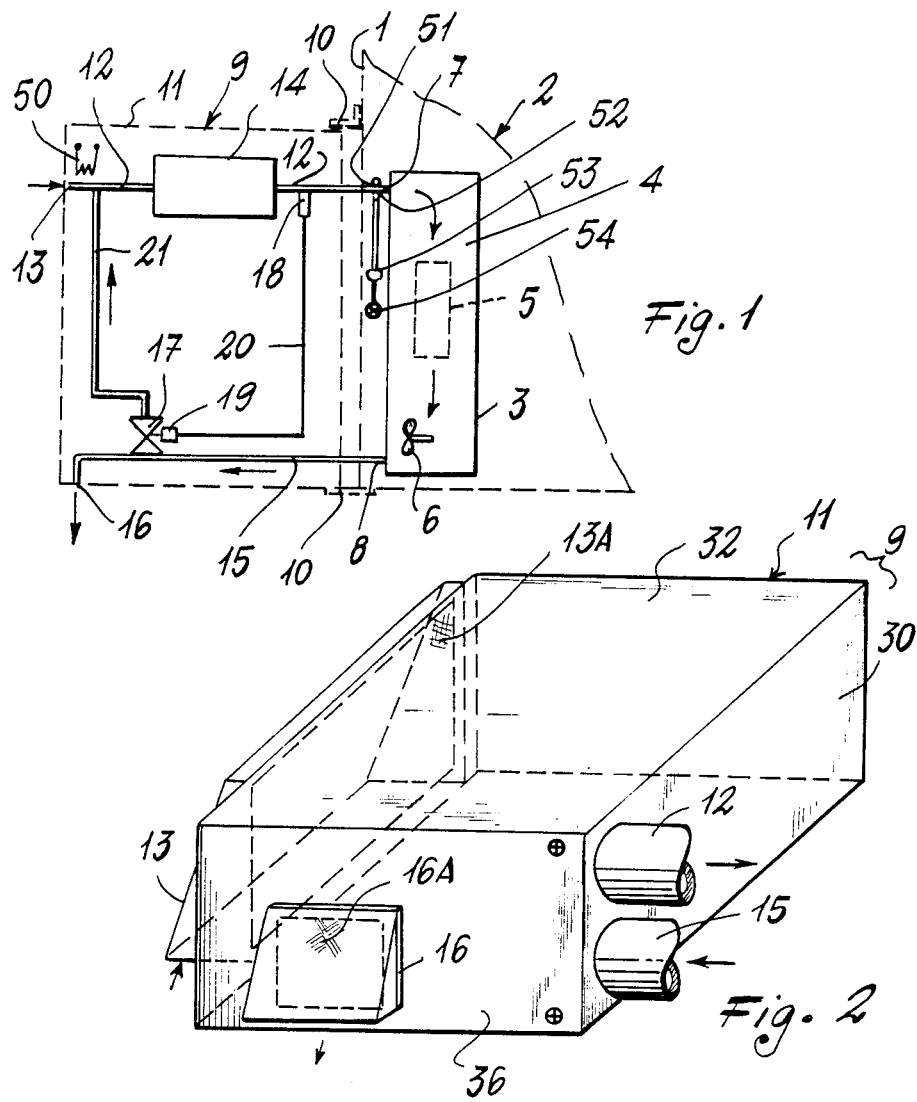
Fig. 1
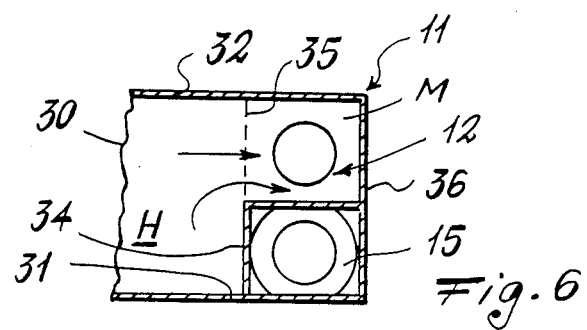
Fig. 2
Fig. 6

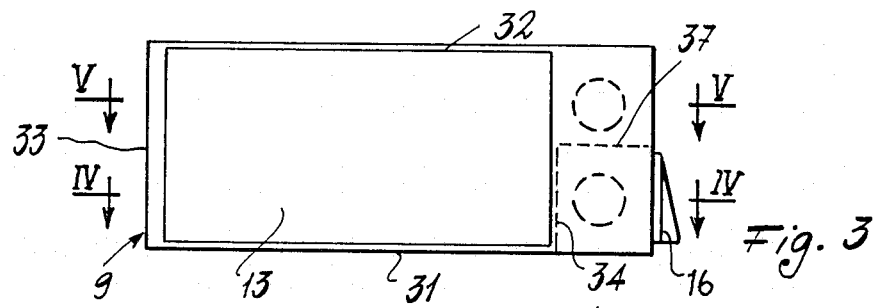
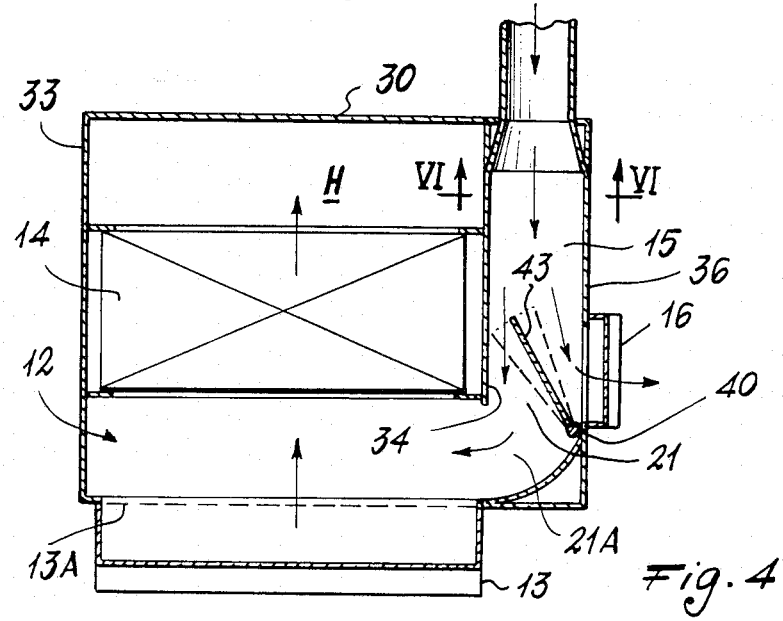
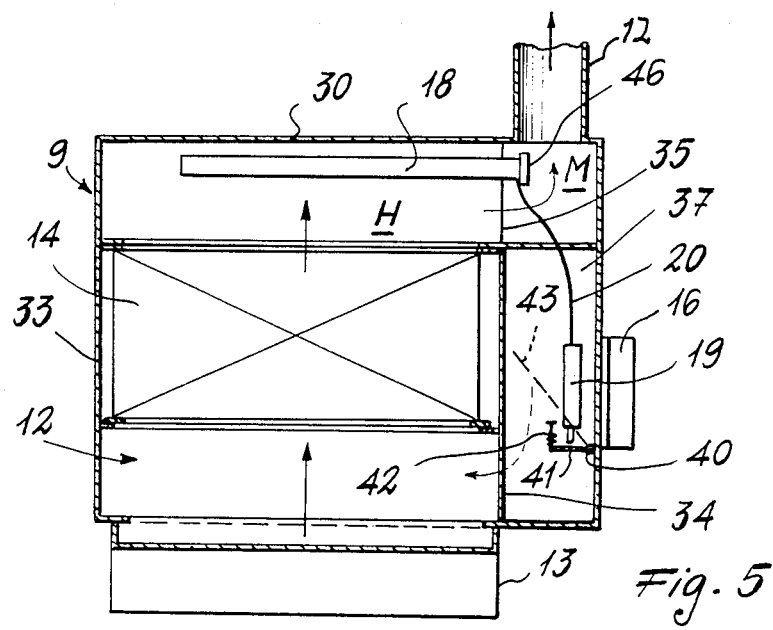

COOLING AIR TREATMENT DEVICE FOR TRANSMITTER VALVES

FIELD OF THE INVENTION

This invention relates to a cooling air treatment device for high-power transmitter valves, typically travelling wave tubes or klystrons, which generally have to be cooled by air to which they transfer many kilowatts of heat.

Such valves are mainly used in earth satellite comunication stations and are installed either in normal buildings or in prefabricated buildings.

BACKGROUND OF THE INVENTION

High-power transmitter valves dissipate large quantities of heat, which has to be removed from the environment in which they are contained in order not to prejudice their operation. The heat removal problem has been solved up to the present time by three different methods.

In a first method, the air is drawn from and expelled into the internal air-conditioned atmosphere of the station. The great drawback of this method is that the station air-conditioning system has to be dimensioned taking account of this increased thermal load, which requires the refrigeration power to be substantially increased. This method therefore requires overdimensioning both of the air conditioning system and of the uninterruptible power supply (UPS) if present in the station, besides representing a wastage of electrical energy.

In a second method, air is drawn in from the outside by way of filters and armoured electrical resistance heaters, which heat the intake air when necessary, the used air being directly expelled to the outside.

With regards to heating, it should be noted that high-power transmitter valves are cooled by air which enters at a temperature not less than a value prescribed by their manufacturer in order not to prejudice their operating characteristics. Moreover, if the system for switching-in the heater elements is not of continuous electronic type (which however is delicate and costly), but of the type comprising a thermostat and electromagnetic switch (and thus robust and economical), considerable transients in the inlet air temperature can arise on switching in the heater elements, which could result in instability.

In a third method, the air is drawn from and expelled into a separate environment of relatively small dimensions. The air temperature in this environment is controlled by a system comprising an electronic amplifier and motorised actuator which expels the excess hot air fraction directly to the outside. This third method is effective, but requires a certain enclosed space which can be problematical to find in prefabricated and/or transportable stations. The active control system also requires an electrical supply and cables, and is subject to faults as in the case of any electronic equipment.

OBJECTS OF THE INVENTION

The main object of the present invention is to propose a fourth method for solving the problem of cooling high-power transmitter valves, which does not have the drawbacks of the known methods. A further object of the present invention is to provide an air treatment device which is substantially passive, i.e., which can operate without (or under the worst conditions with only minimal and in any event occasional) utilisation of electrical energy, and which is easily removable and replaceable.

SUMMARY OF THE INVENTION

These and further objects which will be more apparent from the detailed description given hereinafter are attained by a cooling air treatment device for high-power transmitter valves located in an environment through which air is fed by forced circulation between an inlet point and an outlet point of the environment, characterised by comprising: a first duct which extends between an external air intake port and the inlet point of the environment and in which a filter is disposed; a second duct which extends between the outlet point of the environment and a discharge port for discharge to the outside and in which there is provided a valve means which, under the control of a temperature transducer, controls a connection with the first duct between the external air intake port and filter in order to recycle a fraction of the air directed towards the discharge port.

BRIEF DESCRIPTION OF THE DRAWINGS

The invention will be more apparent from the detailed description of a preferred embodiment thereof given hereinafter by way of non-limiting example with reference to the accompanying figures, in which:

FIG. 1 is a circuit diagram of the device;

FIG. 2 is an isometric view thereof;

FIG. 3 is a front view thereof;

FIGS. 4 and 5 are a section on the line IV—IV and on the line V—V of FIG. 3, respectively; and FIG. 6 is partial section on the line VI—VI of FIG. 4.

DESCRIPTION OF THE PREFERRED EMBODIMENTS

In the circuit diagram of FIG. 1, the reference numeral 1 indicates the perimetral wall of a satellite earth station indicated overall by 2, in which there is disposed a cabinet or housing 3 defining an environment 4 housing a high-power transmitter valve 5, for example a travelling wave tube, which for correct operation requires its cooling air temperature not to deviate from limits (lying for example between $+50°$ C. and $+5°$ C.) set by the manufacturer.

In order to cool the transmitter valve 5, an air stream is passed through the environment 4 by a fan 6 between an inlet point 7 and an outlet point 8 of said environment.

The device 9 according to the invention is removably fixed by means of brackets and screws 10 to the wall 1 on the outside of the station 2 at a certain distance from the ground. The device 9 comprises a box casing 11 and has a first duct 12 which commences with an air intake port 13 and in which an overdimensioned filter 14 is disposed. The first duct 12 is connected to the inlet point 7 by tubular connectors, not shown in the figure, which pass through the wall 1.

The device 9 also comprises a second duct 15 connected to the outlet point 8 of the environment 4 and terminating in a discharge port 16 disposed on a different face of the box casing 11. In this second duct 15 there is provided a valve means 17 able to deviate a fraction, variable from zero to a maximum value, of the air flow directed towards the discharge port 16 and to feed it by way of a connection 21 into the first duct 12 at a point upstream of the filter 14, so as to obtain at the inlet to the filter 14 a mixture of air entering from the intake port 13 and heated air originating from the environment 4 and recycled by the valve means 17.

The valve means 17 is controlled by an expansion-type temperature transducer 18 by way of a hydraulic actuator 19 connected to the transducer 18 by a tube 20, so that the operation of the valve means 17 requires no electrical circuits which could develop faults and which would require an electrical supply. The transducer 18 and the actuator 19 together with the tube 20 form part of single apparatus, known as a self-operated thermostat and manufactured for example by the company SAMSON AG of Frankfurt on Main, German Federal Republic. The principle of operation of this apparatus is based on the expansion of fluid in the transducer 18 and the use of the consequent pressure for controlling the actuator 19 which operates the valve means 17.

The tranducer 18 is disposed in the first duct 12, at any suitable point between the filter 14 and the inlet point 7 of the environment 4, but preferably within the box casing 11 of the device 9.

The valve means 17, which is further described hereinafter, deviates through the connection 21 a fraction of the air flow entering the second duct 15, in accordance with the temperature measured by the transducer 18. The deviated fraction varies from zero (connection 21 closed) to a maximum for example of 70%, which means that there will always be an air flow through the discharge port 16.

The operation of the device is now apparent.

Air is circulated by starting the fan 6, which is in any event provided in the environment 4 independently of the pressure of the device according to the invention.

External air is drawn in through the intake port 13, passes through the filter 14 and grazes the transducer 18 of the self-operated thermostat, to enter the environment 4 where it cools the transmitter valve 5. The degree of opening of the valve means 17 is regulated in accordance with the temperature measured by the transducer 18. Thus the hot air leaving the environment 4 is partly recycled through the connection 21 and partly expelled through the discharge port 16, so that the air entering the environment 4 has a temperature compatible with the operating specification of the transmitter valve 5.

If the external air drawn in is already at a relatively high temperature so as not to require any mixing with air recycled through the connection 21, the valve means passes to its closed position, so that the air leaving the environment 4 all passes through the discharge port 16.

In the practical embodiment shown in FIGS. 2 to 5, in which equal or corresponding parts are indicated by the same reference numerals as in FIG. 1, the device 9 according to the invention comprises a substantially parallelepiped casing 11 of stainless steel sheet, in which both the intake port 13 and the discharge port 16, located on different sides of the casing 11, are of the inclined bottom-opening type with protection grids 13A and 16A, respectively. The two ducts 12 and 15 emerge from the casing 11 vertically aligned before being joined to the points 7 and 8 of the environment 4 containing the transmitter valve 5. The first duct or inlet duct 12 has a first section or chamber H which extends in length from the intake port 13 to the opposing wall 30 of the casing 11, and extends in height from the lower wall 31 to the upper wall 32 of the casing 11. The length of the chamber H is defined by the opposing wall 33 of the casing 11 which is opposite the discharge port 16, and by a parallel dividing wall 34. The filter 14 is disposed substantially half way along this section to occupy it transversely. The second section of the duct 12 commences at an aperture or interruption 35 in the wall 34, this aperture or interruption (see FIG. 6 in particular) being present in the upper rear part of the wall 34. The last section M of the first duct 12 leads to the outlet of the casing 11 of the device, for connection to the inlet point 7 of the environment 4.

Within the casing 11 of the device 9, the second duct or discharge duct 15 is defined in terms of length by the wall 36 comprising the discharge port 16 and by the dividing wall 34, and in terms of height by a horizontal baffle 37 which separates the second duct 15 from the section M of the first duct 12.

The valve means 17, which is provided in the second duct 15 in correspondence with its discharge port, consists of a flap valve 43 which at one end is rigid with a vertical shaft 40 rotatably supported in any suitable known manner between the lower wall 31 of the casing 11 of the device 9 and the horizontal baffle 37. The shaft 40 of the flap valve 43 passes through the baffle 37 (see FIG. 5) and terminates with a radial arm 41. The actuator 19 and a return spring 42 act on the radial arm 41. The actuator 19, the spring 42, and the arm 41 are disposed above the baffle 37.

The transducer 18 is disposed partly in the section H and partly in the section M of the first duct 12, and it is supported by the baffle 37 by means of a support pad 46 so as to extend in cantilever manner into the section H.

The recycle connection 21 consists in practice of that portion of the second duct 15 which extends beyond the flap valve 43, and which opens into the section H through an aperture 21A provided in the dividing wall 34 in a position diagonally opposite the aperture 35 which connects together the sections H and M of the first duct 12.

The two end-of-travel positions of the flap valve 43 are indicated by dotted lines in FIG. 4.

The casing 11 will obviously be provided with at least one access door, not shown for simplicity.

The device according to the invention operates reliably in a completely passive manner, without the use of electrical energy and without the need for electrical connections, and it can be easily removed and replaced.

Only if the device is used in very low- temperature zones, for example of −25°-35° C., there is the need to provide a start-up heater consisting of electrical resistance heater elements 50 situated in the section H of the first duct 12 between the intake port 13 and the filter 14. They can be switched on manually at initial start-up, or during maintenance, in order to maintain the air temperature within acceptable limits or to deice or dehumidify the system if required.

Temperature alarm switches 51, 52 can be provided at the inlet point 7 of the environment 4. Two can be used, set for example to 5° and 50° C. and connected to a logic gate 53 so as to provide a general temperature alarm, for example by means of a warning light 54.

What is claimed is:

1. In combination:
   (a) a housing having an air inlet and an air outlet;
   (b) a high-power transmitter valve disposed in said housing;
   (c) first means for passing an air steam from said air inlet of said housing over said high-power transmitter valve and out said air outlet of said housing;
   (d) a casing having an air intake port and an air discharge port;

(e) a first duct extending from said air intake port of said casing to said air inlet of said housing;
(f) a second duct extending from said air outlet of said housing to said air discharge port of said casing;
(g) a filter disposed in said first duct;
(h) a third duct extending from a first point on said first duct located in said casing upstream of said filter to a second point on said second duct located in said casing;
(i) second means for deviating a fraction of the air passing through said second duct into said third duct;
(j) an expansion-type temperature tranducer for sensing the temperature of the air in said first duct at a third point downstream of said filter; and
(k) a hydraulic actuator for controlling said second means in response to the temperature sensed by said temperature transducer.

2. The combination recited in claim 1 wherein said second means closes off said third duct when said temperature transducer senses a preset temperature.

3. The combination recited in claim 1 wherein said temperature transducer is disposed within said casing.

4. The combination recited in claim 1 wherein said second means comprises a flap valve rotably mounted in proximity to said air discharge port of said casing and connected to an arm on which said hydraulic actuator acts in opposition to a spring.

5. The combination recited in claim 1 and further comprising an electrical resistance heater element disposed in said casing.

6. The combination recited in claim 1 and further comprising a third means for issuing an alarm when the air in said first duct downstream of said filter reaches a preset temperature.

7. The combination recited in claim 1 wherein:
(a) said first duct comprises a first section having a first cross sectional area and a second section having a second cross sectional area;
(b) the cross sectional area of said first section is larger than the cross sectional area of said second section;
(c) said filter is disposed in said first section;
(d) said first section is horizontally side-by-side with said second duct; and
(e) said second section is vertically side-by-side with said second duct.

8. The combination recited in claim 1 wherein said third point is located in said casing.

* * * * *